(12) United States Patent
Andersson et al.

(10) Patent No.: US 7,136,742 B2
(45) Date of Patent: Nov. 14, 2006

(54) ENGINE KILL-SWITCH CONTROL CIRCUIT AND METHOD OF OPERATING THE SAME

(75) Inventors: Martin N. Andersson, Caro, MI (US); George M. Pattullo, Caro, MI (US)

(73) Assignee: Walbro Engine Management, L.L.C., Tucson, AZ (US)

(*) Notice: Subject to any disclaimer, the term of this patent is extended or adjusted under 35 U.S.C. 154(b) by 0 days.

(21) Appl. No.: 10/955,108

(22) Filed: Sep. 30, 2004

(65) Prior Publication Data
US 2006/0069495 A1    Mar. 30, 2006

(51) Int. Cl.
*F02P 9/00*    (2006.01)
(52) U.S. Cl. ................................. 701/112; 123/198 DC
(58) Field of Classification Search ...................... None
See application file for complete search history.

(56) References Cited

U.S. PATENT DOCUMENTS 4,111,175 A * 9/1978 Nakamura et al. ..... 123/198 DC
4,574,752 A    3/1986 Reichert, Jr. et al.
5,048,503 A    9/1991 Suzuki et al.

FOREIGN PATENT DOCUMENTS

JP    60-233371 A  * 11/1985
JP     6-307264 A  * 11/1994 ................. 123/334

* cited by examiner

*Primary Examiner*—Andrew M. Dolinar
(74) *Attorney, Agent, or Firm*—Reising, Ethington, Barnes, Kisselle, P.C.

(57) ABSTRACT

A kill-switch control circuit for use with a light-duty combustion engine determines whether to execute a controlled shut down method or an immediate shut down method in response to kill-switch activation. The selection of a shut down method is made, at least in part, by using engine speed readings and by counting engine revolutions. The controlled shut down method utilizes ignition timing delay and/or spark ratio techniques to quickly bring the engine to a stop, yet does so in a controlled manner that avoids backfiring and other undesirable effects. Conversely, the immediate shut down method abruptly stops sending a current to the spark plug.

20 Claims, 3 Drawing Sheets

ENGINE KILL-SWITCH CONTROL CIRCUIT AND METHOD OF OPERATING THE SAME

FIELD OF THE INVENTION

The present invention generally relates to ignition systems for internal combustion engines, and more particularly, to control circuits and methods for shutting down a combustion engine in a controlled manner.

BACKGROUND OF THE INVENTION

Internal combustion engines commonly have kill-switches incorporated into their ignition systems so that manual or automatic activation of the kill-switch results in an immediate shut down of the engine. Various types of kill-switches and accompanying circuitry have been utilized across a variety of applications, including light-duty combustion engines. The term 'light-duty combustion engine' used herein broadly includes all types of non-automotive combustion engines, including two- and four-stroke engines used with hand-held power tools, lawn and garden equipment, lawnmowers, weed trimmers, edgers, chain saws, snowblowers, personal watercraft, boats, snowmobiles, motorcycles, all-terrain-vehicles, etc.

Under certain operating conditions, activation of some kill-switches can result in an engine backfiring or emitting a flame from an exhaust pipe outlet. This is because many engines currently operate on leaner air/fuel mixtures or utilize catalytic converters in order to improve their emission characteristics. This can result in the engine having 'hot spots', which generally include any high temperature area of the engine capable of causing an unintended combustion of air/fuel charges. Hot spots are commonly located in the combustion chamber and exhaust system and can unintentionally ignite air/fuel charges, thereby causing the engine to backfire or to emit a flame. One factor that can contribute to air/fuel charge build up, and hence unintentional combustion, is when an engine operating at high speeds is suddenly shut off via activation of a kill-switch.

For example, a typical hand-held trimmer operating at an engine speed of 10,000 rpm can take approximately 2.5 sec to come to a complete stop after the kill-switch has been activated and the ignition system has stopped sending an ignition pulse to the spark plug. During that time, a considerable amount of air/fuel mixture passes through the combustion chamber and enters the exhaust system, at which point it can build up and be ignited by one or more hot spots. As previously mentioned, such an ignition can result in the engine backfiring, producing a loud noise commonly called an "after boom", and/or discharging a blue flame.

Some applications address this issue by using a solenoid that shuts off fuel in response to kill-switch activation. For example, a typical lawn tractor operating at an engine speed of 3,600 rpm can take five seconds or so to come to a complete stop after a kill-switch has been activated. During this time, the solenoid blocks excess fuel from entering the muffler and thereby prevents backfiring.

SUMMARY OF THE INVENTION

A control circuit for use with a combustion engine includes a kill-switch and an electronic processor. Upon receiving a shut down signal from the kill-switch, the electronic processor provides at least a first trigger signal at a first ignition timing and a second trigger signal at a second ignition timing that is delayed or retarded relative to the first ignition timing.

According to another aspect of the invention, upon receiving a shut down signal, the electronic processor provides at least a first trigger signal according to a first ratio of sparks to engine revolutions and a second trigger signal according to a second ratio of sparks to engine revolutions, and each of the first and second ratios is less than 1.

According to other aspects of the invention, there are provided methods for shutting down a combustion engine in response to activation of a kill-switch.

At least some potential objects, features and advantages of at least some embodiments of this invention include providing a control circuit that executes a controlled shut down method or an immediate shut down method in response to activation of a kill-switch, a control circuit that utilizes an ignition timing delay and/or spark ratio techniques to quickly bring an engine to a stop, and a control circuit that reduces unburned hydrocarbon emissions and avoids backfiring, blue flame discharging, and an after boom. This design improves kill-switch responsiveness and is relatively simple and economical to manufacture and assemble, and in service has a significantly increased useful life.

BRIEF DESCRIPTION OF THE DRAWINGS

These and other objects, features and advantages of the present invention will be apparent from the following detailed description of the preferred embodiments and best mode, the appended claims, and the accompanying drawings, in which:

DETAILED DESCRIPTION OF THE PREFERRED EMBODIMENTS

Ignition System

Figure 1:
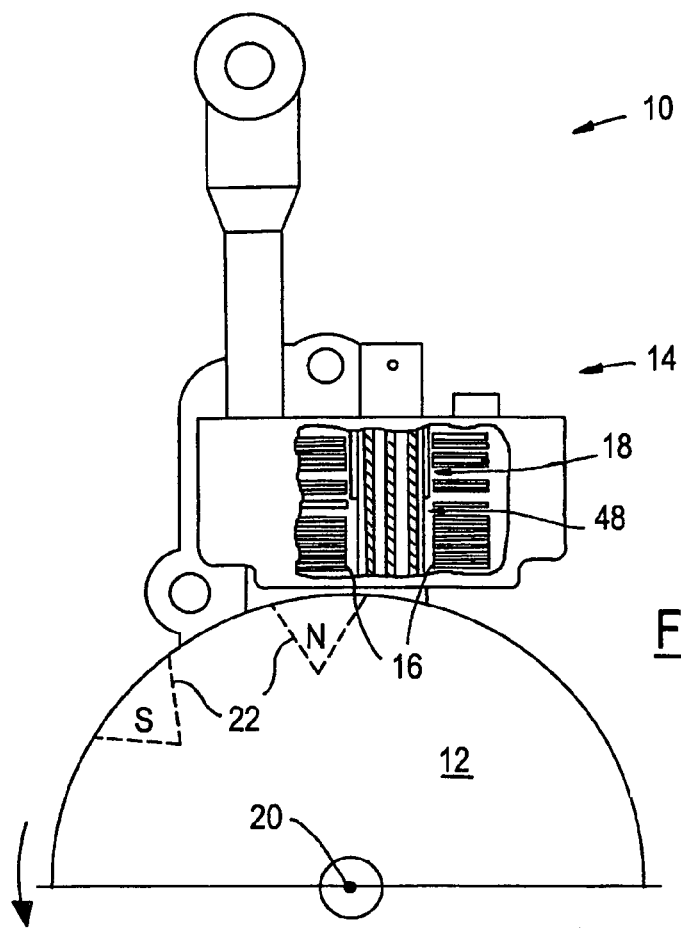
FIG. 1 is a fragmentary plan view with a portion broken away of an ignition system for a light-duty combustion engine.

Referring to FIG. 1, there is shown an example of an ignition system 10 for a light-duty combustion engine that can utilize kill-switch control circuits and controlled shut down methods of the present invention. Ignition system 10 is preferably a capacitive discharge ignition system that interacts with a flywheel 12 and generally includes an ignition timing circuit 14, an input winding 16, and a primary winding 18. The flywheel 12 is coupled to an engine crankshaft (not shown) and rotates about an axis 20 under the power of the engine. By using its rotational inertia, the flywheel moderates fluctuations in engine speed, thereby providing a more constant and even output. Flywheel 12 includes magnetic sections 22 located near an outer circumference of the flywheel. Once the flywheel is rotating, these magnetic sections 22 spin past and electromagnetically interact with input winding 16 so that a voltage proportional to the rotational speed of flywheel 12, and hence the engine, is induced in the input winding 16.

Ignition Timing Circuit

Figure 2:
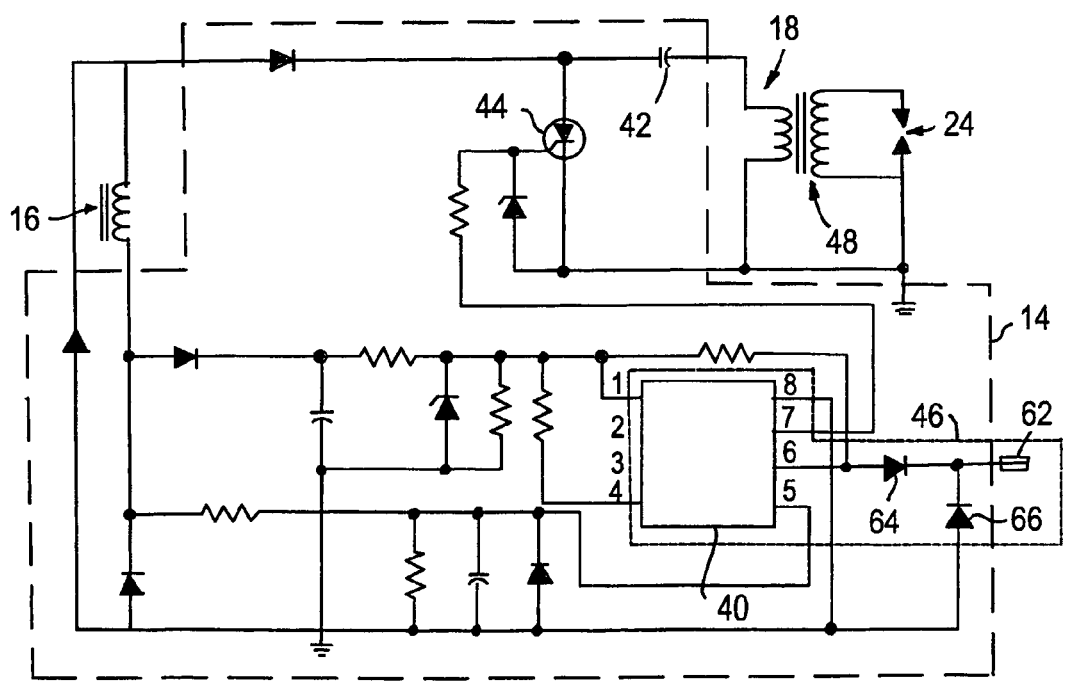
FIG. 2 is a circuit diagram of an ignition timing circuit for use with the ignition system of FIG. 1, including an embodiment of the kill-switch control circuit of the present invention.

With reference to FIG. 2, there is shown an example of an ignition timing circuit 14 that may utilize kill-switch control circuits and controlled shut down methods of the invention, as will be set forth in more detail. Of course, other ignition systems and/or ignition timing circuits may also utilize the circuits and methods of the present invention, as the embodiments shown here are provided for exemplary purposes. Ignition timing circuit 14 interacts with input winding 16 and primary winding 18, and is primarily responsible for storing and delivering a high voltage ignition pulse to a spark plug 24 according to a desired ignition timing. Circuit 14 can of course accomplish additional tasks, and generally comprises an electronic processor 40, a main discharge capacitor 42, a switching thyristor 44, and a kill-switch control circuit 46.

Electronic processor 40 is preferably an 8-pin, 4 MHz processor, such as model #12509 produced by Microchip, Inc., that utilizes 1024 Kb of memory to store the code for operating the overall ignition timing, as well as that for a controlled engine shut down. The term 'electronic processor' broadly includes all types of microcontrollers, microprocessors, as well as any other type of electronic processing device capable of executing electronic instructions. Pins 1 and 4 of electronic processor 40 are coupled to input winding 16 such that the voltage induced in the input winding supplies the electronic processor with power. When a voltage is induced in input winding 16, current passes through a diode and charges main discharge capacitor 42, assuming main switching thyristor 44 is in a non-conductive state. Main discharge capacitor 42 holds the stored charge until the electronic processor changes the state of the thyristor, at which point capacitor 42 dumps the stored charge and creates a high voltage ignition pulse in a secondary winding 48, as is known by those skilled in the art. Pin 5 is also coupled to input winding 16 and receives an engine speed signal which is indicative of the engine speed. This engine speed signal can be used to calculate a desired ignition timing, as explained more thoroughly in U.S. application Ser. Nos. 10/186,522 and 10/765,415 which are each herein incorporated by reference. The engine speed signal can also be used for a controlled engine shut down, as will be subsequently explained in greater detail. Pin 6 is coupled to kill-switch 62, which acts as a manual override for shutting down the engine. Pin 7 is preferably coupled to the gate of thyristor 44 and transmits an ignition trigger signal which controls the state of the thyristor. The term 'trigger signal' is used herein to broadly include any type of electronic signal that when sent causes an ignition system, not only capacitive discharge ignition systems, to deliver a high voltage ignition pulse to a spark plug. When the trigger signal on pin 7 is low, the thyristor 44 is nonconductive and capacitor 42 is allowed to charge; when the trigger signal is high, the thyristor is conductive and the capacitor discharges. Thus, electronic processor 40 governs the discharge of capacitor 42 by controlling the conductive state of thyristor 44 with a trigger signal. Lastly, pin 8 provides the electronic processor with a ground reference.

In general operation, the rotating flywheel 12 induces a voltage in input winding 16 that performs several functions: i) it charges main discharge capacitor 42, ii) it provides electronic processor 40 with power, and iii) it provides the electronic processor with an engine speed signal. As main discharge capacitor 42 charges, the electronic processor 40 executes a series of instructions that control different aspects of the ignition process, including any ignition timing calculations that need to be performed. Electronic processor 40 then outputs a trigger signal on pin 7, according to a calculated ignition timing, which turns on thyristor 44. Once the thyristor 44 is conductive, a voltage is created across primary winding 18 which induces a high voltage ignition pulse in secondary winding 48. This high voltage ignition pulse is then delivered to spark plug 24 where it arcs across a spark gap, thus beginning the combustion process. If at any time kill-switch 62 is activated, then kill-switch control circuit 46 initiates one of several shut down methods, including the controlled shut down method of the present invention.

Kill-Switch Control Circuit

Kill-switch control circuit 46 is preferably part of the larger ignition timing circuit 14, however, it could be provided as a stand alone circuit or as a circuit embedded within some other circuit. In a preferred embodiment, the kill-switch control circuit 46 is a digital circuit including a kill-switch 62, the electronic processor 40 already discussed, and several diodes 64, 66. It should be appreciated that though this particular kill-switch control circuit 46 shares electronic processor 40 with ignition timing circuit 14, it is possible for circuits 14 and 46 to each have their own dedicated electronic processor, or some other combination of electronic processors.

Kill-switch 62 can be provided according to one of numerous embodiments known to those skilled in the art, but is preferably a 'latch' or 'rocker' type switch that is of the 'positive stop/automatic on' variety. The 'positive stop' portion of that term refers to those kill-switches capable of activating engine shut down as soon as switch contact is made; thereby avoiding the requirement that switch contact be maintained until the engine comes to a complete stop. The 'automatic on' portion of the term refers to those kill-switches that are automatically reset following their activation, and therefore do not require any additional actions on the part of the operator before starting the engine again. Activation of kill-switch 62 causes it to provide a 'shut down signal', which is broadly defined as any signal that indicates that the kill-switch 62 has been activated. The kill-switch control circuit 46 could be designed such that activation of kill-switch 62 causes the switch to send an electronic signal, such as an interrupt signal, to electronic processor 40. Alternatively, kill-switch control circuit 46 could be arranged so that electronic processor 40 periodically queries or interrogates kill-switch 62. In either of these exemplary cases, whether it be the electronic signal generated by the kill-switch 62 or the electronic signal that is the result of an interrogation, the signal that indicates activation of kill-switch 62 constitutes the shut down signal. Of course, other scenarios also exist where the shut down signal is of neither of the illustrative types provided above.

Electronic processor 40 has already been described above, thus, a duplicate explanation here has been omitted. Standard diode 64 and zener diode 66 protect input pin 6 on the electronic processor and kill-switch 62 by regulating the flow of current, as is well known in the art. Alternatively, kill-switch control circuit 46 could include additional components not shown here, it could have one or more of the diodes 64, 66 either removed or substituted, or it could be rearranged according to a different circuit arrangement known to those of ordinary skill in the art, to name but a few alternative arrangements.

Controlled Shut Down Method

Figure 3A:
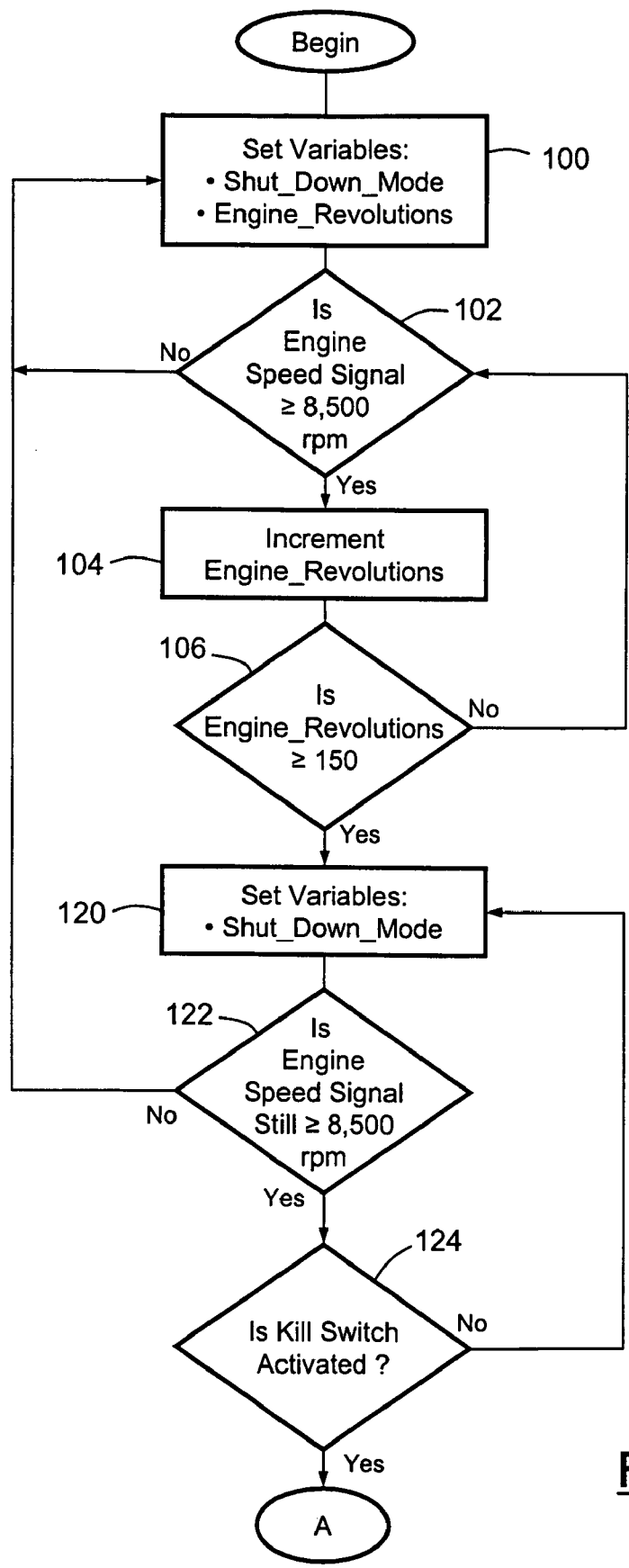
FIG. 3A is a flowchart showing some of the operational steps of an embodiment of the controlled shut down method of the present invention, which can be utilized by the kill-switch control circuit of FIG. 2.

Turning now to FIG. 3A, there is shown a flowchart that demonstrates some of the operational steps of an embodiment of a controlled engine shutdown method of this invention. Beginning with step 100, which occurs during normal engine operation, several variables, flags, counters, etc. are initialized. These include Shut_Down_Mode which is set to 'Immediate' and Engine_Revolutions which is set to '0'. If kill-switch 62 were activated while Shut_Down_Mode was set to Immediate, then electronic processor 40 would simply execute an immediate shut down method, which abruptly stops sending high voltage ignition pulses to the spark plug. In step 102, the electronic processor takes an engine speed reading by receiving an engine speed signal on pin 5, and compares the engine speed signal to a predetermined value X, such as 8,500 rpm. If the engine speed signal is less than 8,500 rpm, then control of the method returns to step 100 such that normal engine operation continues and the values for Shut_Down_Mode and Engine_Revolutions remain unchanged. The numerical RPM value of X is typically selected to be indicative of engine operating conditions producing exhaust gasses that are hot enough to causes backfiring, exhaust flames and/or after booms if an immediate engine shutdown were executed.

If, however, the engine speed signal is greater than or equal to 8,500 rpm, then control of the method passes to step 104 where Engine_Revolutions is incremented by a predetermined step value, such as 1. Step 106 then determines if the engine has been operating at a minimum speed (8,500 rpm in this example) for a minimum number of engine revolutions (150 revolutions in this example). If Engine_Revolutions has not reached 150, then control of the method is returned to step 102 to determine if the engine speed is still at least 8,500 rpm. This check again of engine speed takes into account a situation where the engine only temporarily exceeded 8,500 rpm; in which case, step 102 would send control of the method back to step 100 and Engine_Revolutions would be reset to 0. Assuming that the engine speed is still equal to or greater than 8,500 rpm, then step 104 again increments Engine_Revolutions. This reiterative process continues until either the engine speed signal falls below 8,500 rpm, in which case control passes back to step 100, or Engine_Revolutions reaches 150, at which point step 120 is encountered. It should be noted, one or more additional steps for checking the status of kill-switch 62 could be added somewhere between steps 100 and 106. This way, if kill-switch 62 were activated during execution of one or more of these steps, then electronic processor 40 would execute an immediate shut down method pursuant to the status of Shut_Down_Mode.

Figure 3B:
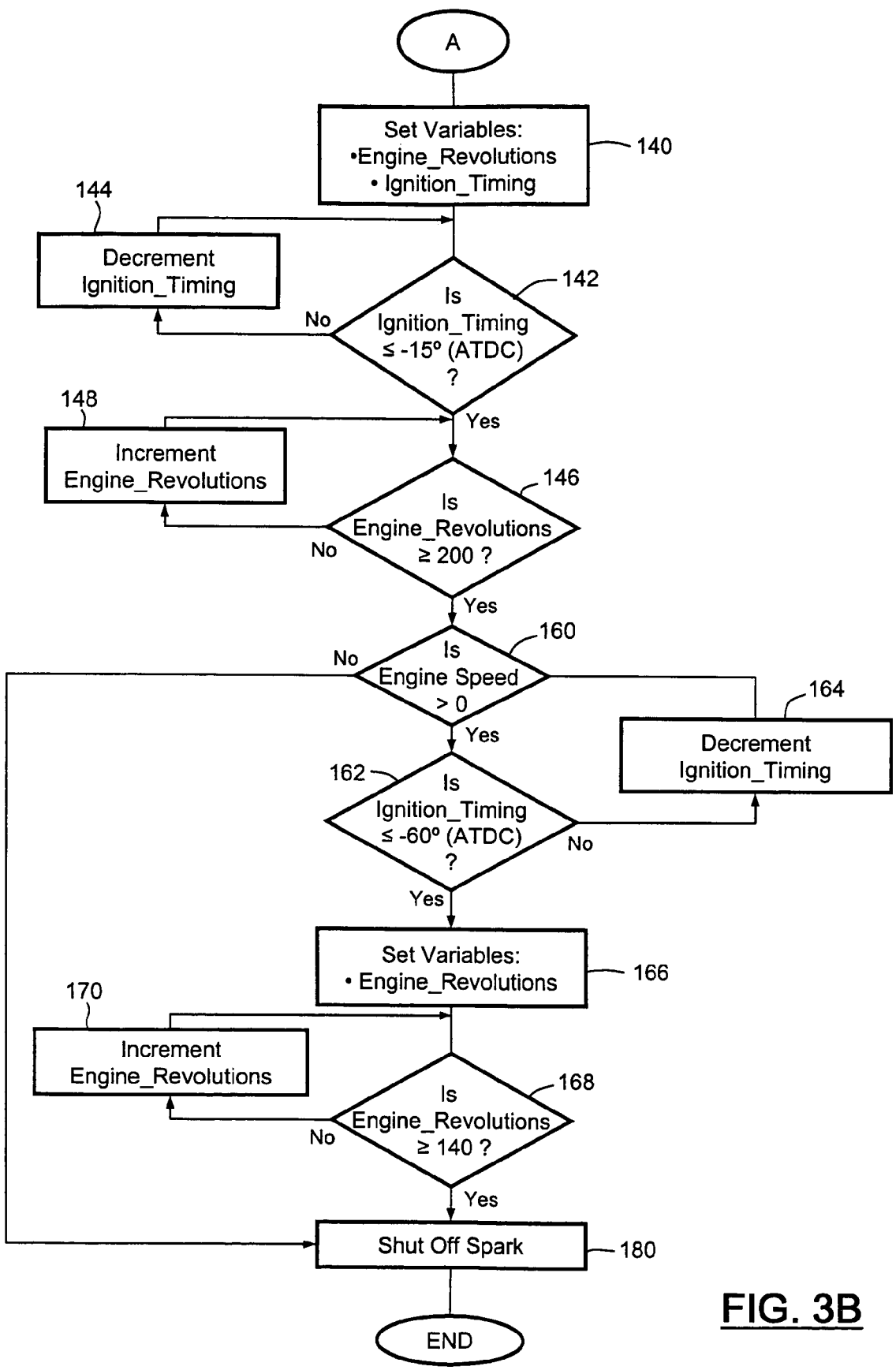
FIG. 3B is a continuation of the flowchart of FIG. 3A.

In step 120, Shut_Down_Mode is set to 'controlled'. This marks the enablement of a controlled engine shut down method, so that if kill-switch 62 were activated at this time the electronic processor 40 would execute a controlled shut down method and not an immediate shut down method. According to the preferred embodiment shown here, the controlled shut down method utilizes both ignition timing and spark ratio (ratios of sparks to engine revolutions) techniques to quickly bring the engine to a stop, yet do so while at least reducing and preferably eliminating unintended ignition by one or more hot spots that can cause backfiring or flame emission. The first step following enablement of the controlled shut down method, is to make sure that the engine is still operating at a speed of at least 8,500 rpm, step 122. If not, control is sent back to step 100; if it is, then control advances to step 124. Step 124 checks the status of kill-switch 62 to determine if it has been activated or not. Assuming the kill-switch has not been activated, then control of the method simply loops back to step 120 and continues with the same sequence of steps. This type of set up is akin to the "interrogating" system previously mentioned in connection with the shut down signal. Put differently, instead of kill-switch 62 sending an interrupt-type signal to indicate activation of kill-switch 62, electronic processor 40 periodically interrogates kill-switch 62 to check its status. Of course, the controlled shut down method of the present invention could also be used with an interrupt-type arrangement as well. If kill-switch 62 has been activated, then the method continues on FIG. 3B with step 140.

Step 140 sets or initializes several variables, including Engine_Revolutions which is reset to '0' and Ignition_Timing which determines when the ignition trigger signal is sent. Ignition_Timing can be set in one of two ways. According to a first embodiment, 0.3° is subtracted (in the direction of a timing delay) from the previous ignition timing setting to arrive at a new Ignition_Timing value. According to a second embodiment, the Ignition_Timing value is set to 0.3° (ATDC) on the next engine revolution, regardless of what the previous ignition timing setting was. In either case, steps 142 and 144 form a reiterative loop where step 142 checks to see if Ignition_Timing has reached a timing delay limit, such as 15° (ATDC). If it has not, then step 144 decrements the Ignition_Timing value according to a predetermined rate of change or step value. In one presently preferred implementation, that rate of change is desirably between −0.1°/rev and −2.0°/rev, and preferably about −0.3°/rev. Stated differently, ignition timing circuit 14 provides a first trigger signal at a first ignition timing (Ignition_Timing) which causes a first high voltage ignition pulse to be sent to spark plug 24, after which, the Ignition_Timing value is decremented according to a rate of change (−0.3°/rev) and a second trigger signal is sent at a newly calculated, second ignition timing which causes a second high voltage ignition pulse to be sent to the spark plug. It follows, that the second ignition timing is delayed relative to the first ignition timing. This reiterative process continues across a group of trigger signals until the Ignition_Timing value reaches a timing delay limit such as 15° (ATDC), at which point steps 146, 148 maintain the delayed ignition timing for one or more engine revolutions. By maintaining the delayed ignition timing, the engine generates less power so that it slows down and preferably comes to a controlled stop. According to a preferred embodiment, the timing delay limit is between 5° (ATDC) and 25° (ATDC) and it is maintained for 50 to 350 engine revolutions; preferably, the timing delay limit is about 15° (ATDC) and the number of engine revolutions at which that limit is maintained is 200 revs. Alternatively, the timing delay limit (15° ATDC in the example above) could be maintained as long as the speed of the engine is above a certain predetermined speed, instead of for a set number of engine revolutions. Once the rpms fell below that predetermined engine speed, then control of the method could progress to step 160.

Often times, 200 engine revolutions with a timing delay of 15° (ATDC) will be sufficient to bring the engine to a stop. If this is the case, then step 160 sends control of the method to step 180, which shuts off the current being sent to the spark plug. If the engine is still moving when the controlled shut down method encounters step 160, then steps 162 and 164 successively delay the ignition timing at a more aggressive rate of change, preferably −0.6°/rev (twice that of the previous rate of change), until Ignition_Timing reaches 60° (ATDC). Alternatively, the controlled shut down method could utilize a timing advance, as opposed to the timing delay described above, in order to bring the engine to a controlled stop. For example, the Ignition_Timing could initially be set to 50° (BTDC) and then gradually advanced until it reaches 80° (BTDC), or vice-versa. If such a timing advance is used, then the preferred range of timing advances is between 45° (BTDC) and 100° (BTDC). By firing the spark plug at an extreme advanced position, it creates backpressure on the piston as it moves upward towards TDC. If properly controlled and phased in, this timing advance method can bring the engine to a stop quite quickly.

The term 'ignition timing' used herein broadly relates to the timing at which a high voltage ignition pulse is sent to the spark plug relative to the position of the piston within the cylinder. For instance, when the engine is being operated at high speeds it is sometimes desirable to initiate the combustion process early so that the combustion reaction has adequate time to develop and assert its force upon the piston. Thus, the ignition system delivers a spark to the combustion chamber before the piston reaches a top-dead-center (TDC) position, an occurrence commonly referred to as a timing advance. Conversely, if the engine is being operated at relatively low speeds or the engine is being shut down, it may be desirable for the spark plug to fire after the piston has reached its TDC position, which is generally referred to as a timing delay or retard.

In step 166, Engine_Revolutions is again set to '0', so that steps 168 and 170 can cycle through an additional 140 engine revolutions with the ignition timing set at 60° (ATDC). Put differently, the trigger signals being sent during steps 162, 164 are part of a second group of trigger signals that are provided at ignition timings determined according to a second rate of change, namely −0.6°/rev in one presently preferred embodiment. This second rate of change is greater than the first rate of change, meaning that it more rapidly changes the ignition timing. Often times, the additional engine revolutions (140 revs) at the more delayed ignition timing (60° ATDC) will cause the engine to come to a complete stop. However, in order to make sure that the engine is no longer firing, step 180 causes ignition timing circuit 14 to stop sending a trigger signal, which in turn causes ignition system 10 to stop sending a high voltage ignition pulse to spark plug 24.

As previously mentioned, a controlled engine shut down method can also utilize a spark ratio, which generally is the ratio of sparks to engine revolutions. For instance, ignition timing circuit 14 could begin providing a trigger signal once per every two engine revolutions, thus resulting in the spark plug firing every other engine revolution. In that example, the ratio of sparks to engine revolutions is 1:2, as opposed to a ratio of 1:1 under normal conditions when no sparks are skipped and the spark plug is firing every engine revolution. Using a spark ratio that is less than 1 (1:1) is a useful technique for bringing the engine down in a controlled fashion. Referring back to steps 144, 148, 164 and 170, it is possible to utilize a spark ratio of less than 1 in one or more of these steps. Furthermore, the spark ratio could be maintained at a constant ratio, such as 1:2, or it could be gradually decreased so that fewer and fewer sparks per revolutions are delivered to spark plug 24. According to an exemplary embodiment, the spark ratio would be set to 2:3 (sparks:revolutions) for 25 engine revolutions, after which it would be set to 1:2 (sparks:revolutions) for an additional 120 revolutions, and finally it would be set to 1:3 (sparks:revolutions) for a remaining 20 revolutions. By gradually increasing the number of skipped spark revolutions, the controlled shut down method is able to slow down the engine in a controlled manner. According to a preferred embodiment, the ratio of sparks to engine revolutions is between 1:5 and 4:5 (sparks:revolutions), inclusive. Accordingly, the controlled shut down method can utilize ignition timing delays, spark ratios less than 1, or both techniques to quickly bring an engine to a stop in a controlled manner.

The kill-switch control circuit and controlled shut down method previously explained are exemplary embodiments, and are not intended to limit the scope of the present invention. Modification and substitutions will be apparent to persons of ordinary skill in this art upon review of this disclosure. For example, the values for engine speeds that determine the flow of control within the controlled shut down method could differ from those provided, and an average engine speed could be calculated over a predetermined number of engine revolutions instead of a single reading. Moreover, the high voltage ignition pulse could be generated by systems other than a capacitive discharge ignition system, such as a "flyback" type ignition system. Also, operational steps could be added, removed, substituted, altered, etc., as those shown are simply exemplary method steps. Still other changes and modifications will become apparent to those skilled in the art and all such variations and modifications are intended to come within the spirit and scope of the appended claims.

The invention claimed is:

1. A control circuit for use with a combustion engine, comprising:
   a kill-switch having an output that provides a shut down signal; and
   an electronic processor having an input that receives said shut down signal and an output that provides a trigger signal;
   wherein upon receiving said shut down signal, said electronic processing device provides at least a first trigger signal at a first ignition timing and a second trigger signal at a second ignition timing that is delayed relative to said first ignition timing.

2. The control circuit of claim 1, wherein said kill-switch is a positive off and automatic on type switch.

3. The control circuit of claim 1, wherein said first trigger signal is part of a first group of trigger signals provided at ignition timings that are determined according to a first rate of change (−X°/revolution), such that the ignition timing of each trigger signal is delayed relative to the ignition timing of the preceding trigger signal.

4. The control circuit of claim 3, wherein said first rate of change is generally between −0.1°/revolution and −2.0°/revolution.

5. The control circuit of claim 3, wherein the ignition timings of said first group continue to change according to said first rate of change until they reach a first timing delay limit, at which point the ignition timing is maintained at said first timing delay limit for one or more engine revolutions.

6. The control circuit of claim 5, wherein said first timing delay limit is generally between 5° and 25° after top dead center (ATDC).

7. The control circuit of claim 5, wherein said number of engine revolutions is generally between 50 and 350 revolutions.

8. The control circuit of claim 3, wherein the ignition timings of said first group continue to change according to said first rate of change until they reach a first timing delay limit, at which point the ignition timing is maintained at said first timing delay limit until the engine reaches a predetermined engine speed.

9. The control circuit of claim 3, wherein said second trigger signal is part of a second group of trigger signals provided at ignition timings that are determined according to a second rate of change (−X°/revolution), wherein said second rate of change is greater than said first rate of change.

10. The control circuit of claim 1, wherein at least one of said first and second trigger signals is provided according to a ratio of sparks to engine revolutions (sparks:revolutions) that is less than 1.

11. The control circuit of claim 10, wherein said ratio is generally between 1:5 and 4:5 (sparks:revolutions), inclusive.

12. An ignition system having:
an input winding for inducing a voltage;
an ignition timing circuit for storing said induced voltage in the form a stored charge; and
a primary winding for transforming said stored charge into a high voltage ignition pulse;
wherein said ignition timing circuit at least includes a control circuit, comprising:
a kill-switch having an output that provides a shut down signal; and
an electronic processor having an input that receives said shut down signal and an output that provides a trigger signal;
wherein upon receiving said shut down signal, said electronic processing device provides at least a first trigger signal at a first ignition timing and a second trigger signal at a second ignition timing that is delayed relative to said first ignition timing.

13. A control circuit for use with a combustion engine, comprising:
a kill-switch having an output that provides a shut down signal; and
an electronic processor having an input that receives said shut down signal and an output that provides a trigger signal;
wherein upon receiving said shut down signal, said electronic processor provides at least a first trigger signal according to a first ratio of sparks to engine revolutions (sparks:revolutions) and a second trigger signal according to a second ratio of sparks to engine revolutions (sparks:revolutions), wherein each of said first and second ratios is less than 1.

14. The control circuit of claim 13, wherein said kill-switch is a positive off and automatic on type switch.

15. The control circuit of claim 13, wherein at least one of said first and second ratios is generally between 1:5 and 4:5 (sparks:revolutions), inclusive.

16. The control circuit of claim 13, wherein said first trigger signal is part of a first group of trigger signals provided at said first ratio for a predetermined number of engine revolutions.

17. The control circuit of claim 13, wherein at least one of said first and second trigger signals is provided at a delayed ignition timing.

18. An ignition system having:
an input winding for inducing a voltage;
an ignition timing circuit for storing said induced voltage in the form a stored charge; and
a primary winding for transforming said stored charge into a high voltage ignition pulse;
wherein said ignition timing circuit at least including a control circuit, comprising:
a kill-switch having an output that provides a shut down signal; and
an electronic processor having an input that receives said shut down signal and an output that provides a trigger signal;
wherein upon receiving said shut down signal, said electronic processor provides at least a first trigger signal according to a first ratio of sparks to engine revolutions (sparks:revolutions) and a second trigger signal according to a second ratio of sparks to engine revolutions (sparks:revolutions), wherein each of said first and second ratios is less than 1.

19. A shut down method for use with a light-duty combustion engine, comprising the steps of:
(a) generating a shut down signal in response to activating a kill-switch;
(b) determining an ignition timing delay for facilitating a controlled shut down of the engine; and
(c) providing a plurality of high voltage ignition pulses having a progressive ignition timing delay to a spark plug in response to receiving said shut down signal, such that the ignition timing of each trigger signal is delayed relative to the ignition timing of the preceding trigger signal.

20. The method of claim 19, wherein step (c) further includes providing a high voltage ignition pulse according to a ratio of sparks to engine revolutions (sparks:revolutions) that is less than 1.

* * * * *